US009151343B2

(12) United States Patent
Norton

(10) Patent No.: US 9,151,343 B2
(45) Date of Patent: Oct. 6, 2015

(54) BALL LOCK COMPENSATOR FOR USE WITH A ROBOTIC DEVICE

(71) Applicant: ATI Industrial Automation, Inc., Apex, NC (US)

(72) Inventor: Daniel Allen Norton, Cary, NC (US)

(73) Assignee: ATI Industrial Automation, Inc., Apex, NC (US)

( * ) Notice: Subject to any disclaimer, the term of this patent is extended or adjusted under 35 U.S.C. 154(b) by 0 days.

(21) Appl. No.: 13/828,779

(22) Filed: Mar. 14, 2013

(65) Prior Publication Data

US 2014/0270926 A1    Sep. 18, 2014

(51) Int. Cl.
*F16D 41/08*    (2006.01)
*B25J 17/02*    (2006.01)

(52) U.S. Cl.
CPC ........... *F16D 41/086* (2013.01); *B25J 17/0233* (2013.01); *Y10T 403/592* (2015.01)

(58) Field of Classification Search
CPC .... B25J 15/04; B25J 15/0408; B25J 15/0416; B25J 17/0208; B25J 17/0216; B25J 17/0225; B25J 17/0233; B23B 31/1071; B23B 2260/022; F16L 37/23
USPC ......... 403/93, 94, 96, 314, 322.1, 322.2, 361, 403/408.1, DIG. 4, DIG. 8, 1; 74/490.01, 74/490.05; 901/28, 29, 41; 483/901; 192/38, 39, 45.005, 57, 59, 65, 71, 76
See application file for complete search history.

(56) References Cited

U.S. PATENT DOCUMENTS

| | | | |
|---|---|---|---|
| 4,242,017 A | | 12/1980 | De Fazio |
| 4,311,224 A | * | 1/1982 | Kato et al. .................. 192/56.5 |
| 4,458,424 A | | 7/1984 | Cutkosky et al. |
| 4,537,557 A | | 8/1985 | Whitney |
| 4,549,846 A | * | 10/1985 | Torii et al. ..................... 414/729 |
| 4,636,135 A | | 1/1987 | Bancon |
| 4,652,203 A | * | 3/1987 | Nakashima et al. .......... 414/730 |
| 4,679,956 A | | 7/1987 | Douglas et al. |
| 4,696,524 A | | 9/1987 | Cloyd |
| 4,697,676 A | * | 10/1987 | Haake ......................... 192/223.2 |
| 4,759,686 A | | 7/1988 | Kirst |
| 4,775,269 A | * | 10/1988 | Brix .......................... 408/239 R |
| 4,815,780 A | | 3/1989 | Obrist |

(Continued)

FOREIGN PATENT DOCUMENTS

| | | |
|---|---|---|
| GB | 2262502 A | 6/1993 |
| JP | 8052682 A | 2/1996 |
| JP | 11114870 A | 4/1999 |

OTHER PUBLICATIONS

U.S. Appl. No. 13/828,589.

*Primary Examiner* — Daniel P Stodola
*Assistant Examiner* — Matthieu Setliff
(74) *Attorney, Agent, or Firm* — Coats & Bennett, P.L.L.C.

(57) ABSTRACT

A compensation device configured to be positioned between a robotic arm and a robotic tool. The device may be configured to directly attach to the tool, or may be configured to be positioned away from the tool. The device generally includes a first section that connects to the robotic arm and a second section that connects to the tool. The second section is movable relative to the first section to provide for the tool to be positioned at various orientations. The second section may comply rotationally about a first axis. The second section may be movable in a second plane. In one embodiment, the second plane is perpendicular to the first axis.

17 Claims, 11 Drawing Sheets

(56) References Cited

U.S. PATENT DOCUMENTS

| | | | |
|---|---|---|---|
| 4,897,014 A * | 1/1990 | Tietze | 414/729 |
| 4,906,123 A | 3/1990 | Weskamp et al. | |
| 5,005,684 A * | 4/1991 | Fujii | 192/56.57 |
| 5,211,501 A | 5/1993 | Nakamura et al. | |
| 5,273,147 A * | 12/1993 | Beigang et al. | 192/104 B |
| 5,909,941 A | 6/1999 | Cheng et al. | |
| 5,918,870 A | 7/1999 | Stark | |
| 6,375,378 B1 | 4/2002 | Kitaura | |
| 6,398,279 B1 | 6/2002 | Kikut | |
| 6,484,612 B1 * | 11/2002 | Miyachi et al. | 82/158 |
| 6,568,717 B1 * | 5/2003 | Le Clinche | 285/315 |
| 6,690,208 B2 | 2/2004 | Gloden et al. | |
| 6,942,082 B1 * | 9/2005 | Bunnow et al. | 192/49 |
| 7,559,265 B2 * | 7/2009 | Mizuno | 74/490.06 |
| 8,005,570 B2 * | 8/2011 | Gloden et al. | 700/245 |
| 8,500,132 B2 * | 8/2013 | Norton | 279/71 |
| 8,533,930 B2 * | 9/2013 | Norton | 29/525 |
| 8,794,418 B1 * | 8/2014 | Norton | 192/150 |
| 2002/0067045 A1 | 6/2002 | Blanchard | |
| 2005/0238420 A1 * | 10/2005 | Hansson | 403/109.3 |
| 2007/0231063 A1 | 10/2007 | Tsutsumi et al. | |
| 2012/0087723 A1 * | 4/2012 | Shafer et al. | 403/361 |

* cited by examiner

BALL LOCK COMPENSATOR FOR USE WITH A ROBOTIC DEVICE

BACKGROUND

The present application is directed to the field of robotics and, more specifically, to a robotic tool compensation device.

Robots are widely utilized in industrial assembly line applications to perform repetitive tasks very precisely without the need for human operation, interaction, or supervision. For example, robots are commonly used in the automotive industry to perform a number of tasks such as material handling and spot-welding of automobile bodies. To amortize the considerable cost of an industrial robot over a variety of tasks, the robot is typically separate from a diverse array of tools, which are removably attached to an end of an arm of the robot.

The robotic tool may encounter obstacles as it performs its various functions. To accommodate a variety of applications, the robotic tool may be designed to "give" or flex, thus providing the tool with a limited amount of freedom of movement when it encounters an obstacle or exerts a torque. This flexibility is referred to as "compliance." The amount of compliance may vary depending upon the context of use, the robot, and/or the robotic tool.

Because an obstacle can exert different forces on the robotic tool depending upon where the two come into contact, it is desirable for the robotic tool to provide compliance in several directions (e.g., in the x, y, and z directions). Additionally, because the environments in which robots are used are sometimes hostile and unsafe for humans, it is also desirable for the robotic tool to be capable of automatically returning to its original position, or "resetting," when the overload condition no longer exists, without the need for human intervention. Thus, it is desirable for the robotic tool to be capable of resetting itself, regardless of whether the overload condition was due to linear or rotational movement.

SUMMARY

The present application is directed to a compensation device configured to be interposed between a robot and a robotic tool. One embodiment includes a first section having an interior space with an axis, and a second section connected to the first section and including a central opening with the second section extending radially around the interior space. The device also includes a piston positioned in the interior space and being movable along the axis, and ball members positioned within the interior space and the central opening with the ball members being radially movable relative to the axis. The piston is movable within the interior space and along the axis between a first position and a second position. The second position is farther away from a bottom of the interior space than the first position. In the second position, the piston is in contact with the ball members to force the ball members radially outward away from the axis and into contact with the second section to secure the position about the axis of the second section relative to the first section.

The device may also include holes in the first section with one of the ball members positioned within each of the holes with the ball members being sized to be movable within the holes when radially moving relative to the axis.

The device may include the holes being aligned around the periphery of the first section.

The device may include the piston having an angled contact surface that contacts against the ball members to force the ball members radially outward away from the axis with the contact surface being aligned at an acute angle relative to the axis.

The device may include the piston, the interior space, the first section, and the central opening each having a circular sectional shape perpendicular to the axis.

The device may include the second section being movably connected to the first section for movement in a plane that is perpendicular to the axis with the second section being further constrained to prevent movement along the axis away from the first section.

The device may include secondary pistons mounted in the first section and movable to contact against the second section to lock the position of the second section within the plane relative to the first section.

The device may include the ball members being spaced apart at equal intervals around the piston.

The device may include the central opening being coaxial with the axis of the interior space when the device is in a home position.

Another embodiment is directed to a compensation device configured to be interposed between a robot and a robotic tool. The device includes a first section, and a piston positioned within the first section and movable along an axis with the piston including a contact surface. The device also includes a second section including an open central section defined by a wall and having a plurality of lobes spaced around the wall and extending into the wall away from the central section with the second section being connected to the first section with the wall extending radially around the first section and the piston. The device includes ball members having a spherical shape and being positioned within the second section and being spaced around the axis with the ball members being radially movable relative to the axis. The piston is movable along the axis between a first position and a second position. The first position includes the contact surface spaced farther away from a second end of the second section than in the second position. The second position includes the contact surface positioned against the ball members and positioning the ball members radially outward away from the axis and into the lobes to secure the position of the second section relative to the first section about the axis.

The device may include each of the lobes having a symmetrical shape about a centerline with each of the lobes including a back wall, a first pair of outwardly extending sections adjacent to the back wall, and a second pair of outwardly extending sections adjacent to the first pair with the first pair of sections angled away from the centerline at a smaller angle than the second pair of sections.

The device may include that the lobes extend axially along the wall from a first end of the second section that faces towards the first section with each of the lobes being axially spaced away from the second end of the second section.

The device may include each of the lobes having a common shape and dimensions.

The device may include a port that extends through the first section and into a chamber that holds the piston.

The device may include that the second section is movably connected to the first section for movement in a plane perpendicular to the axis and is constrained to prevent movement of the second section along the axis and away from the first section.

The device may include secondary pistons mounted in the first section and movable to contact against the second section to lock the position of the second section within the plane relative to the first section.

Another embodiment is directed to a compensation device configured to be interposed between a robot and a robotic tool. The device includes a first section having an interior chamber and a plurality of openings spaced around a periphery of the interior chamber. The device includes a piston positioned within the chamber and being sized to be movable along an axis of the chamber with the piston including a contact surface that radially faces outward away from the axis. The device includes a second section including an interior space defined by a wall and having a plurality of lobes spaced around the wall and extending into the wall away from the interior space with the second section being connected to the first section with the lobes being radially aligned with the plurality of openings. The device includes spherical ball members with one of the ball members positioned within each of the openings, the ball members being radially movable relative to the axis. The piston being movable within the interior chamber and along the axis between a first position with the contact surface spaced away from the ball members and a second position with the contact surface in contact with the ball members and the piston sized to move the ball members radially outward away from the axis and into contact with the lobes to secure the rotational position of the second section relative to the first section about the axis.

The device may include that the second section being movably connected to the first section for movement in a plane perpendicular to the axis and being constrained to prevent movement of the second section along the axis and away from the first section.

The device may include that the ball members remain in the openings when the piston is in the second position.

The device may include a port that extends through the first section and into the chamber.

The various aspects of the various embodiments may be used alone or in any combination, as is desired.

DETAILED DESCRIPTION

The present application is directed to compensation device that is positioned between a robotic arm and a tool. The device allows for the tool to comply rotationally about a first axis, and also for movement within a plane. This movement accommodates forces that may be applied to the tool. The device may be further configured to return the tool to an original or home position when the one or more forces are removed from the tool.

Figure 1:
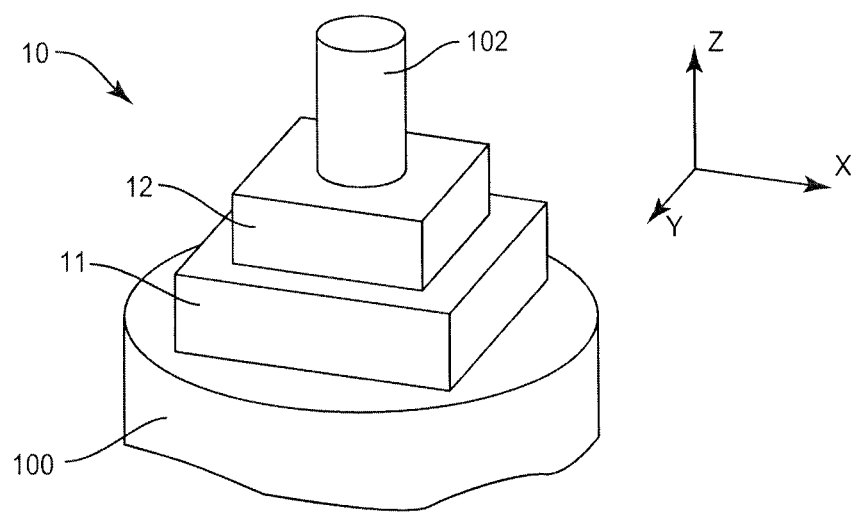
FIG. 1 is a schematic view of a device positioned between a robotic arm and a robotic tool.

FIG. 1 illustrates a compensation device 10 that is positioned between a robotic arm 100 and a robotic tool 102. The device 10 may be configured to directly attach to the tool 102, or may be configured to be positioned away from the tool (e.g., proximally upward along the robotic arm 100 and away from the tool 102). The device 10 generally includes a first section 11 that connects to the robotic arm 100 and a second section 12 that connects to the tool 102. The second section 12 is movable relative to the first section 11 to provide for the tool 102 to be positioned at various orientations. As illustrated in FIG. 1, the second section 12 can comply rotationally about a first axis z. The device 10 may also provide for the second section 12 to be movable within a plane to accommodate additional movement. In the embodiment of FIG. 1, the second section 12 is movable in a plane that is orthogonal to the first axis. In the specific embodiment of FIG. 1, the second section 12 is movable in the x-y plane.

For purposes of this application, the device 10 will be described in the orientation illustrated in FIG. 1. This will include the first section 11 being relatively lower than or below the second section 12 along the z axis. Further, the second section 12 is laterally movable within the x-y plane relative to the z axis. This orientation is for ease of description in describing the relative positioning of the various elements of the device 10. It is understood that the device 10 may be placed in a variety of orientations in which the elements 11, 12 are positioned at a variety of different orientations and movable relative to different axes and within different planes.

FIG. 1 illustrates the device 10 in a home position. Each of the first and second sections 11, 12 are aligned along the z axis and are co-axial with the z axis. The device 10 may be configured to assume this position when no external forces are acting upon it.

Figure 2:
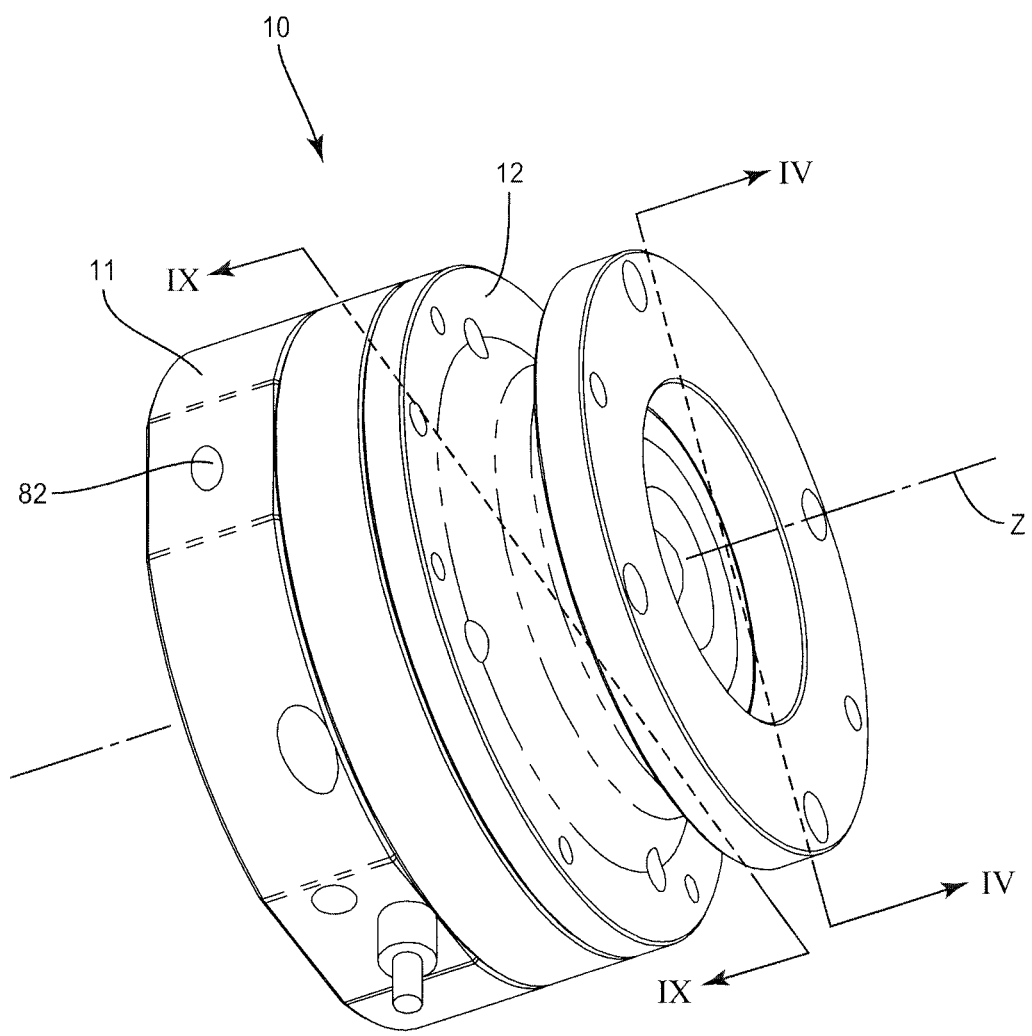
FIG. 2 is a perspective view of a device.

FIG. 2 illustrates one embodiment of the device 10 that includes the first and second sections 11, 12. The device 10 is in the home position aligned along the z axis. The first and second sections 11, 12 may be sized such that the bodies are approximately the same size in the x-y plane and are aligned in an overlapping arrangement in the home position. When moved in the x-y plane away from the home position, the sections 11, 12 move out of alignment such that a portion of the second section 12 does not overlap with the first section 11. In one embodiment, the force necessary to rotate the tool plate 30 about the z axis is substantially the same as that necessary to move the second section 12 in the x-y plane.

Figure 3:
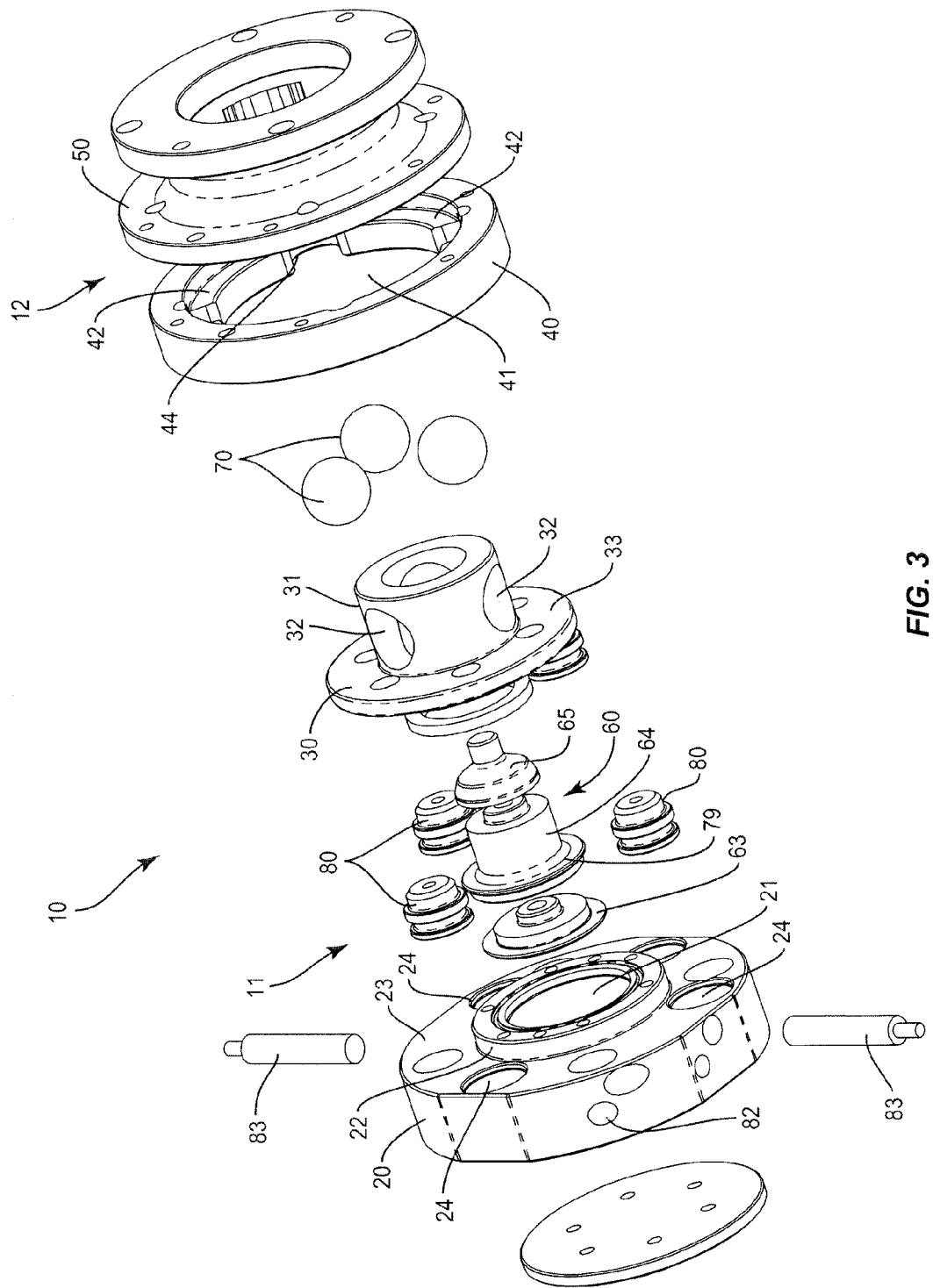
FIG. 3 is an exploded perspective view of a device.
Figure 4:
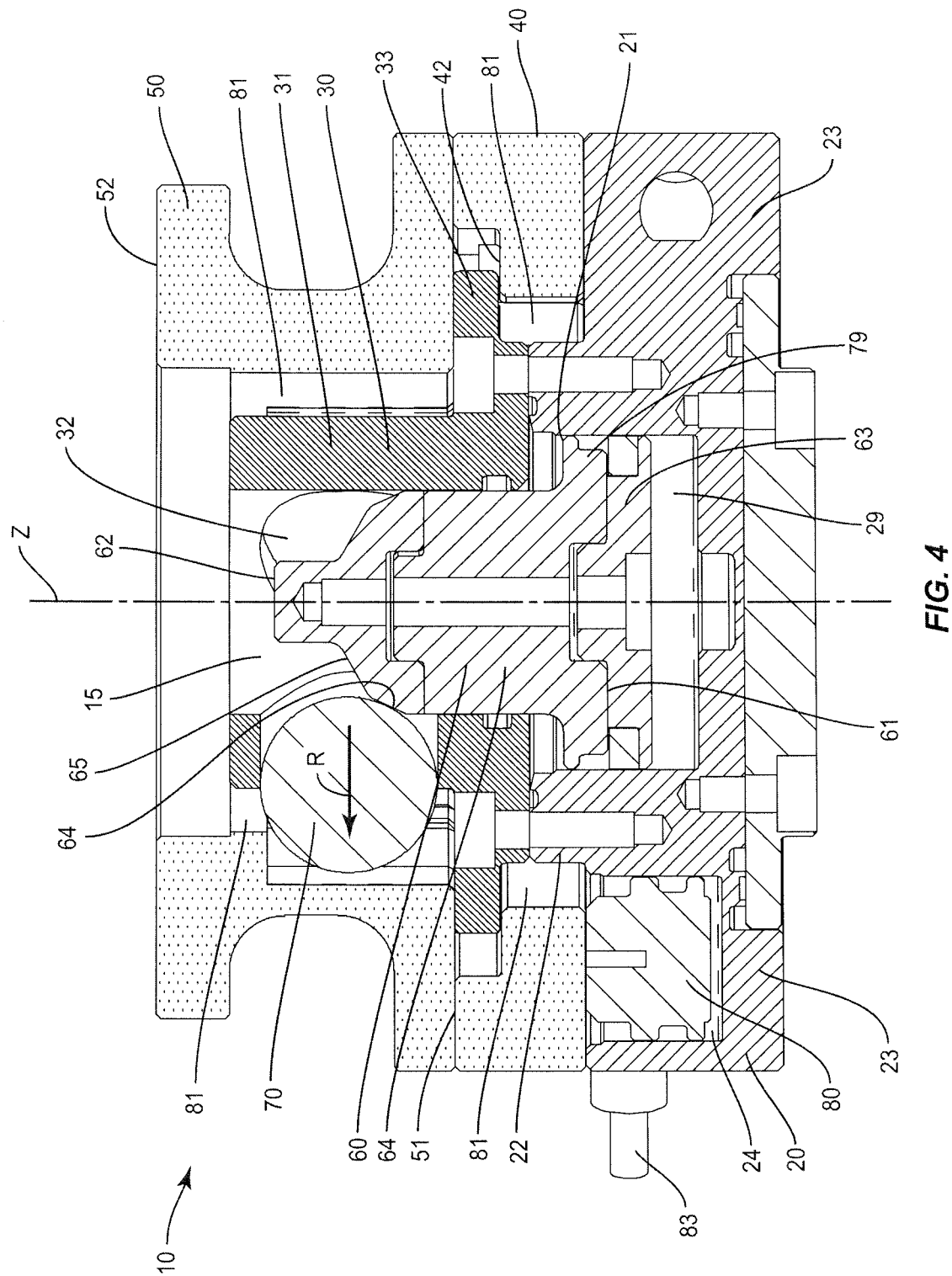
FIG. 4 is a sectional view of the device of FIG. 2 cut along line IV-IV.

FIG. 3 illustrates an exploded view of the device 10 including the first section 11 and the second section 12. The first section 11 includes a base 20 and a ball cage 30. The second section 12 includes a ring 40 and a plate member 50. The device 10 also includes a piston 60 and a plurality of ball members 70 that interact with the first and second sections 11, 12 as will be explained in detail below. Additional pistons 80 are mounted in the base 20 to lock the lateral position of the second section 12 relative to the first section 11 as will also be explained in detail below. FIG. 4 illustrates a section view of the device 10 in the home position. These elements will be described in more detail with reference to FIGS. 3 and 4.

The base 20 includes a cavity 21 positioned at a central section. The cavity 21 is sized to receive the piston 60. The base 20 also includes a peripheral section 23 radially outward from the central section 21. The peripheral section 23 includes one or more chambers 24 each sized to receive one of the pistons 80. The base 20 also includes a neck 22 extends axially along the cavity 21 and upward beyond the peripheral section 23.

The ball cage 30 is attached to a top side of the base 20 and is coaxial with the base 20. The ball cage 30 is mounted to the neck 22 of the base 20 such that a gap measured along the z axis exists between a lower side of the ball cage 30 and the upper side of the peripheral section 23 of the base 20. The ball cage 30 includes a central section 31 with a through opening that is in communication with the central section 21. Openings 32 that face radially outward are positioned in the central section 31 and are sized to receive one of the ball members 70. In one embodiment, the ball cage 30 includes three openings 32. Other embodiments may include fewer or more openings 32 and corresponding ball members 70. The ball cage 30 further includes a flange 33 that extends radially outward at a bottom of the central section 31.

The second section 12 includes a ring member 40 and a plate member 50. The ring member 40 includes an annular shape with a central opening 41. A ledge 42 inward towards the central opening 41. As illustrated in FIG. 4, when the first and second sections 11, 12 are connected together, the ledge 42 extends into the gap formed between the flange 33 of the ball cage 30 and the upper side of the peripheral section 23 of the base 20. The ring member 40 also includes cut-out sections 44 spaced around the periphery of the inner side to provide access for attachment of fasteners for connecting the ring member 40 to the plate member 50.

The plate member 50 includes a first side 51 that faces towards and contacts the ring member 40, and an opposing second side 52. In one embodiment, the second side 52 is configured to receive the tool 102 for use with the robot 100. This may include one or more receptacles for receiving fasteners or other like connectors for attachment of the tool 102. In one embodiment, the second side 52 is substantially flat to facilitate attachment. The plate member 50 includes a central opening 53 that is coaxial with the central opening 41 of the ring member 40 when these elements are connected together.

Figure 5:
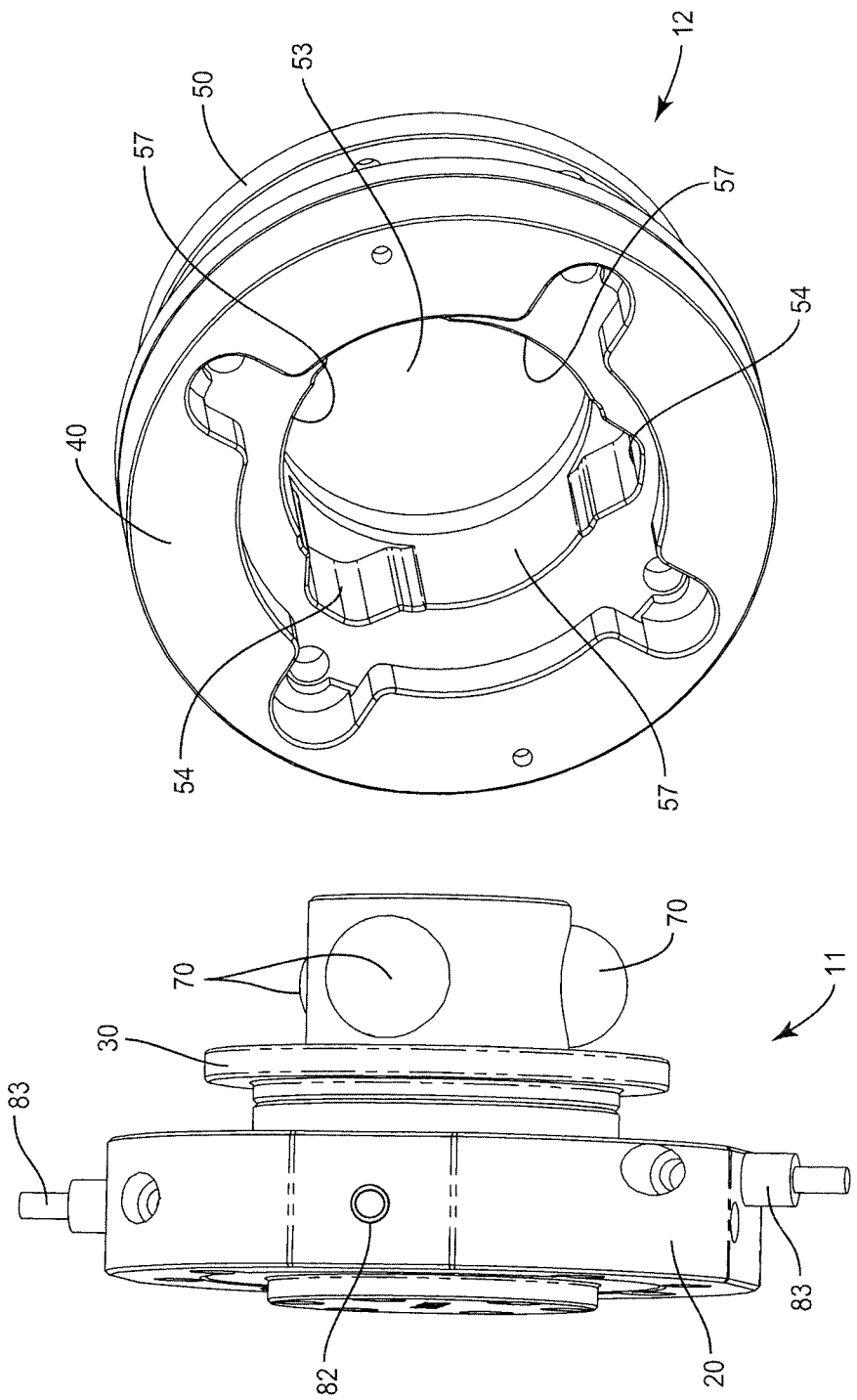
FIG. 5 is a perspective exploded view of a side of a first section and a bottom end of a second section of a device.

As best illustrated in FIG. 5, lobes 54 are spaced apart around the periphery of the inner wall of the central opening 53. The lobes 54 are positioned at the first side 51 and extend axially towards and are spaced away from the second side 52. Each of the lobes 54 is sized to receive one of the ball members 70.

Figure 6:
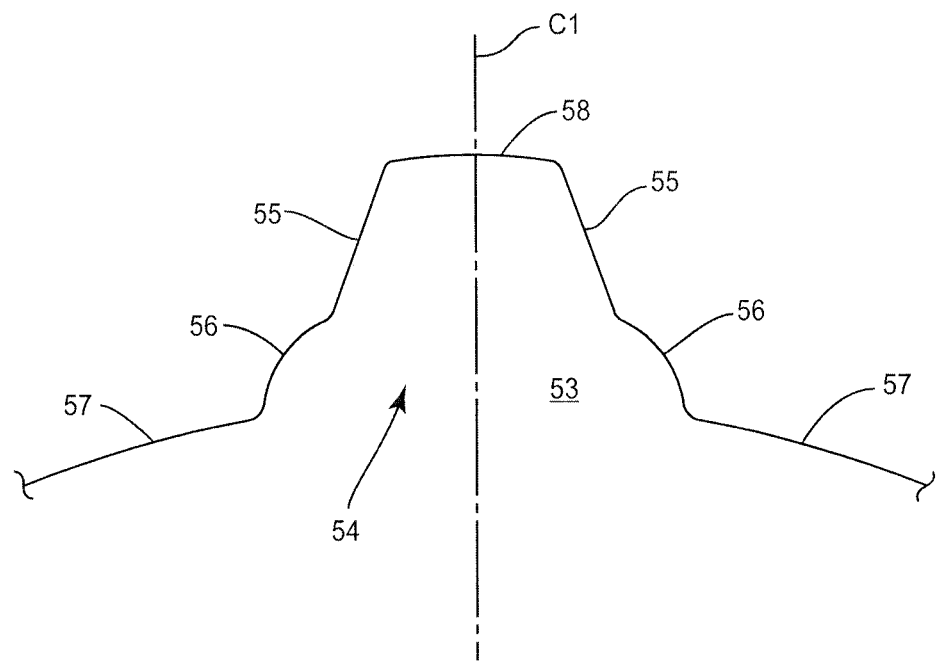
FIG. 6 is a schematic view of a lobe in a plate member that includes various sections.
Figure 7:
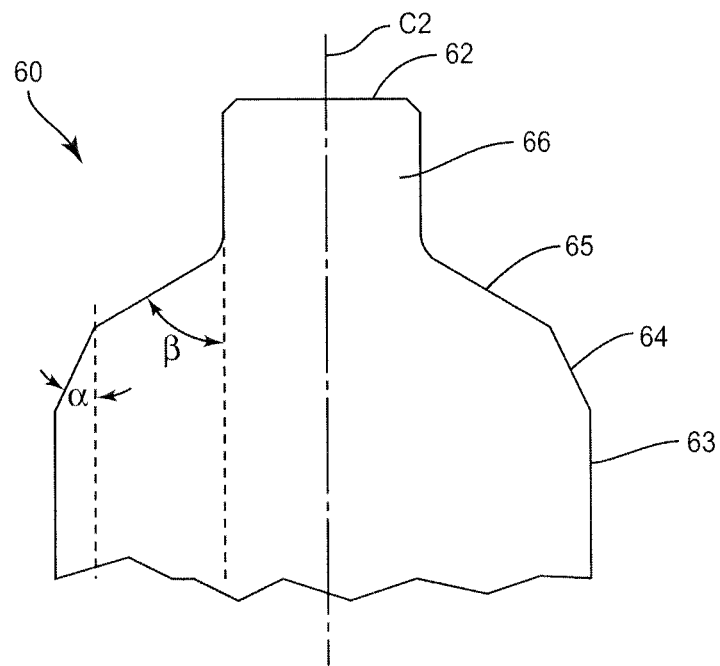
FIG. 7 is a schematic sectional view of a section of a piston with first and second sections aligned at different angles.

FIG. 6 illustrates a lobe 54 positioned along the inner wall 57 of the central section 53. The lobe 54 includes a back portion 58 and first sections 55 along each opposing side. Second sections 56 are positioned between the first sections 55 and the inner wall 57. The lobe 54 is symmetrical about a centerline C1. As illustrated, the first sections 55 extend away from the centerline C1 at a lesser angle than the second sections 56. In one embodiment as illustrated in FIG. 6, the first sections 55 are substantially straight. In one embodiment, the second sections 56 include a curved shape. The curved section accommodates the curved outer surface of one of the ball members 70 when the second section 12 rotates about the z-axis.

As best illustrated in FIGS. 2 and 4, the base 20, ball cage 30, ring 40, and plate member 50 are positioned in a stacked orientation. These elements are each aligned along the z axis when the device 10 is in the home position. Each of these elements includes an open central section that is coaxial when the device 10 is in the home position. Further, the central sections are in communication to form an open interior section 15 that holds the piston 60 and ball members 70.

The piston 60 is movable along the z axis to position the ball members 70. The piston 60 includes a bottom 61 that faces towards the base 20 and an opposing top 62. The bottom 61 includes a cross-sectional size and shape that conforms to the cavity 21 in the base 20. This sizing provides for the piston 60 to be driven upward along the z axis when a fluid is introduced into the cavity 21 below the piston 60. Piston 60 further includes a flange 79 with an enlarged diameter. As illustrated in FIG. 4, the outer diameter of the flange 79 is larger than an inner diameter of the central section 31 of the ball cage 30. This sizing controls the extent of axial movement of the piston 60 along the z-axis. The piston 60 may be constructed as a single piece, or may include multiple pieces such as first section 63, second section 64, and third section 65. The separate pieces 63, 64, 65 may be connected together by one or more fasteners. The sections of the piston 60 may also be connected together in other manners.

The piston 60 is symmetrical about a centerline C2. The piston 60 includes a contact section 63 towards the top 62 that faces radially outward away from the centerline C2 to contact against the ball members 70. The contact section 63 includes a first section 64 positioned at an angle $\alpha$ relative to the centerline C2 and a second section 65 positioned at an angle $\beta$ relative to the centerline C2. The first angle $\alpha$ is smaller than the second angle $\beta$. The first angle $\alpha$ may vary from between about 15-30°, with one specific embodiment including an angle of about 25°. The second angle $\beta$ may vary from between about 40-80°, with one specific embodiment including an angle of about 60°.

The ball members 70 interact with the piston 60 and the sections 11, 12. The ball members 70 each include a spherical shape, and each includes the same size. The number of ball members 70 included with the device 10 may vary, with one specific embodiment including three.

Figure 8:
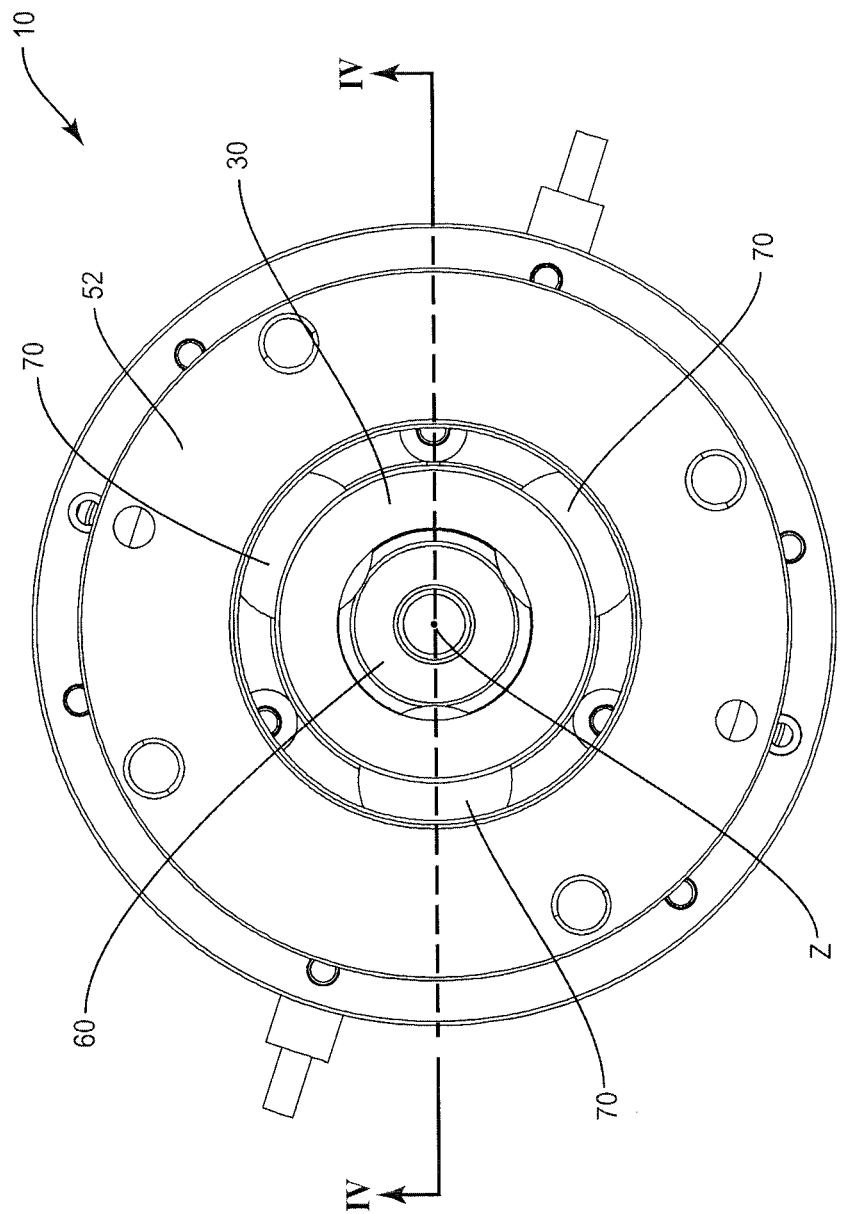
FIG. 8 is a top view of a device in a home position.

FIGS. 4 and 8 illustrate the device 10 in the home position. This position may occur when no external forces are acting upon the device 10. Device 10 assumes this home position due to the piston 60 being biased upward and into contact with the ball members 70. In one embodiment, a fluid such as air or hydraulic fluid is introduced through one or more feed lines 82 into a chamber 29 formed between the piston bottom 61 and the bottom of the cavity 21 in the base 20. This fluid provides a force on the piston 60 to move it along the z axis and into contact with the ball members 70.

As illustrated in FIG. 4, the first section 64 of the piston 60 contacts against the ball members 70. The angle $\alpha$ of the first section 64 causes a force on each of the ball members 70 that is directed radially outward as indicated by arrow R. The ball members 70 are prevented from moving substantially along the z axis by their placement within the openings 32 in the cage 30. Each of the ball members 70 extend outward through their respective opening 32 and into contact with a corresponding lobe 54 in the plate member 50. This outward force applied about the plate member 50 maintains the position of the second section 12 relative to the first section 11.

Figures 9, 9A:
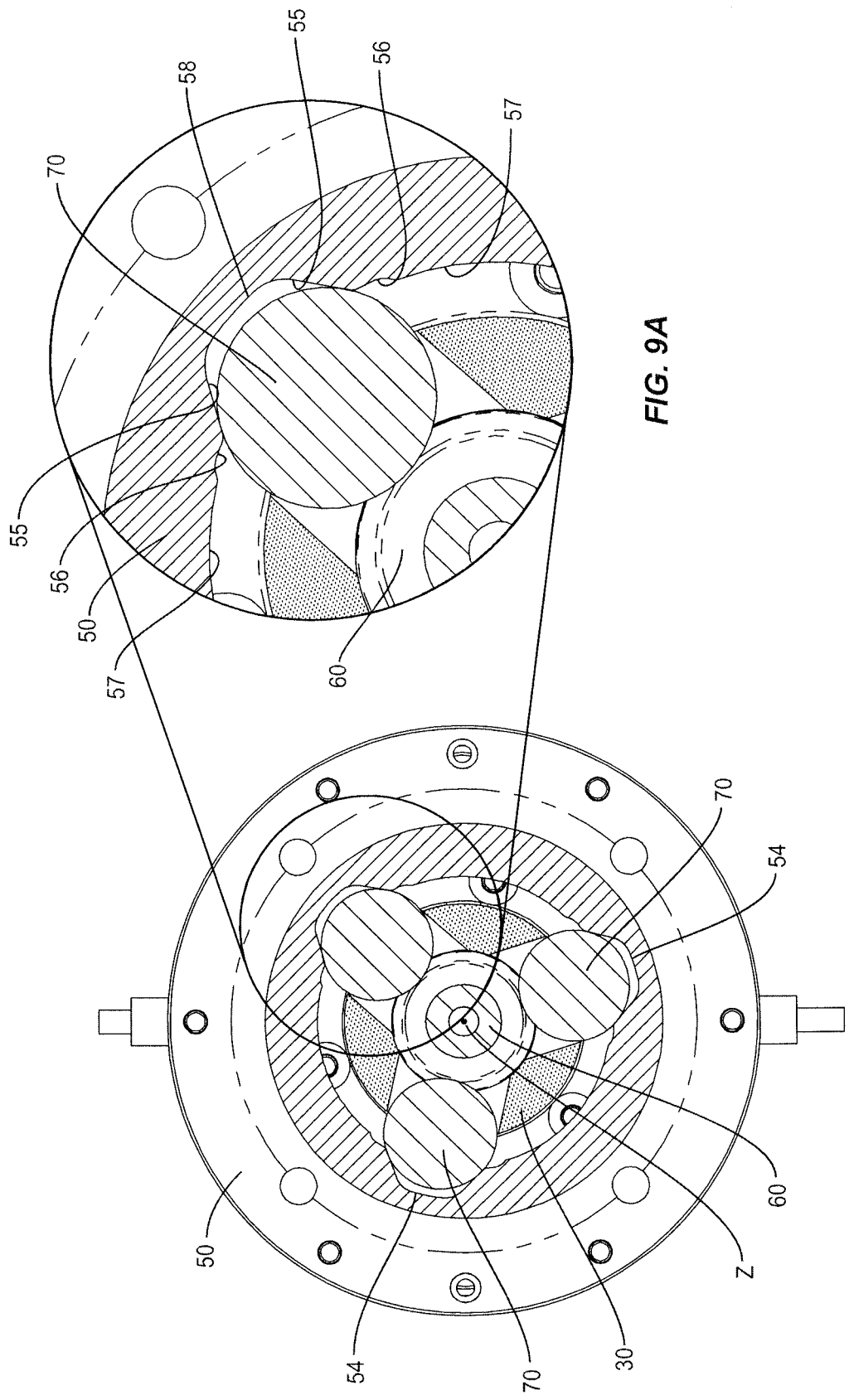
FIG. 9 is a sectional view of the device of FIG. 2 cut along line IX-IX.
FIG. 9A is a cut-away view of a section of FIG. 9 of a ball member located in a lobe of a plate member.
Figure 10:
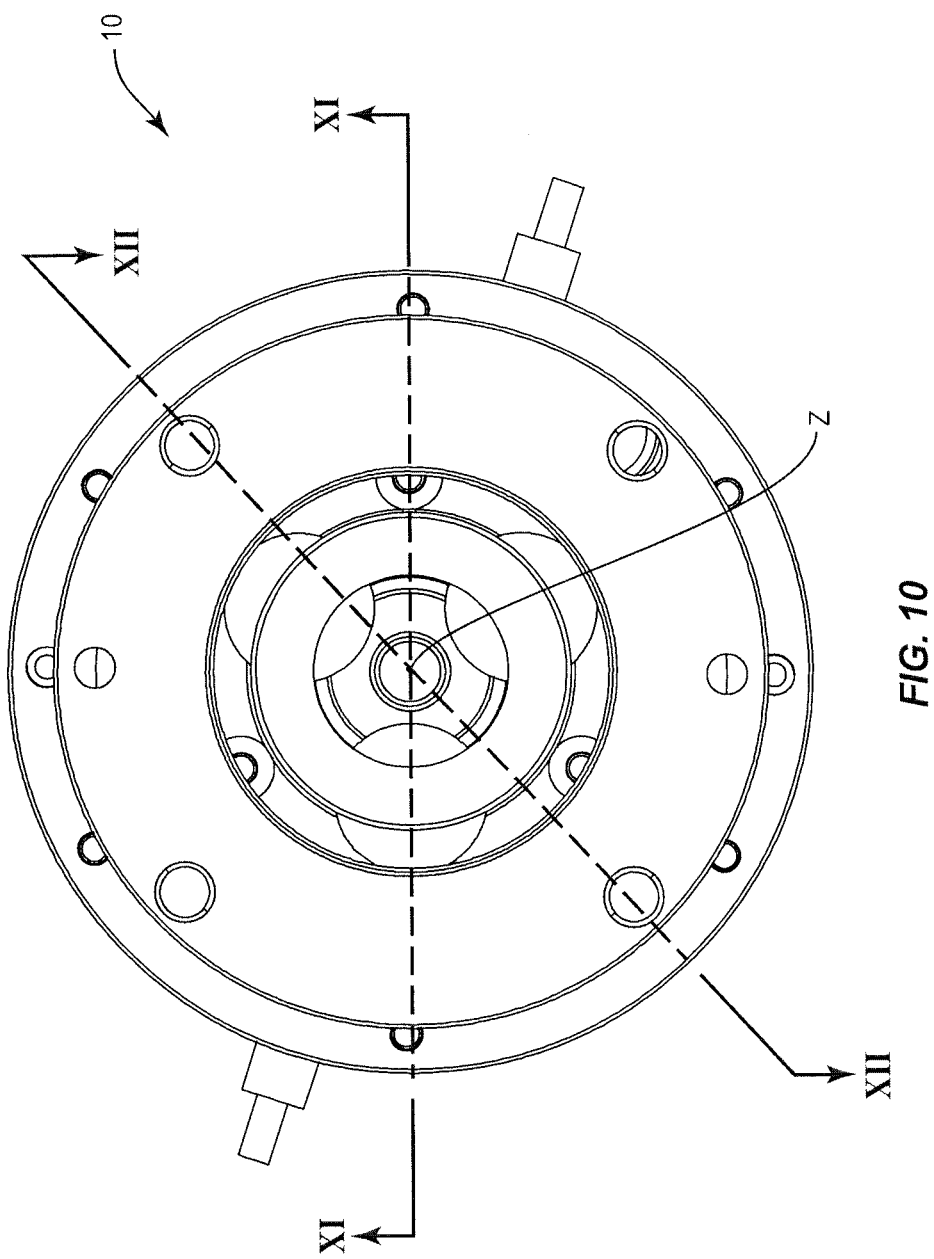
FIG. 10 is a top view of a device rotated about a z-axis.

FIGS. 9 and 9A illustrate the device 10 in the home position with the ball members 70 within each of the lobes 54 formed in the inner wall 57 of the plate member 50. As illustrated, each of the ball members 70 is positioned at the same relative position within one of the lobes 54. The diameter of the ball members 70 is sized to contact against the lobes 54 at two points which are along the first sections 55. The ball members 70 and the lobes 54 are sized such that the ball members 70 are spaced away from the back section 58.

The force applied by the piston 60 through each of the ball members 70 to the plate member 50 maintains the alignment of the first and second sections 11, 12 in this home position.

This alignment can be overcome by a force applied to the tool 102 that applies a torque about the z-axis, or a force along the x-y plane.

FIGS. 10, 11, 12, and 12A illustrate the device 10 complying rotationally about the z-axis. This is caused by a force applied to the second section 12 that overcomes the force being applied through the piston 60 and ball members 70. This force causes the second section 12 to rotate relative to the first section 11 thus causing the lobes 54 to move relative to the ball members 70. At each lobe 54, one of the first sections 55 slides along the ball member 70 and the adjacent second section 56 moves into contact with the ball member 70. In one embodiment, the ball member 70 contacts the lobe 54 at a first point at the intersection of the first and second sections 55, 56 and at a second point at the intersection of the second section and the inner wall 56, 57. The sizing of the ball member 70 and the shape and size of the piston 60 prevent further relative rotation thus limiting the extent of rotational movement of the second section 12 relative to the first section 11. The limit of rotational movement may vary depending upon the context. In one embodiment, the movement provides for rotation of between about 5-30°. In one specific embodiment, the movement is about 15°. In embodiments with the lobes 54 being symmetrical about a centerline C1 (see FIG. 6), the extent of rotational movement is the same in opposing rotational directions. In another embodiment, the lobes 54 may be asymmetrical to allow for additional rotation in one direction.

Figures 12, 12A:
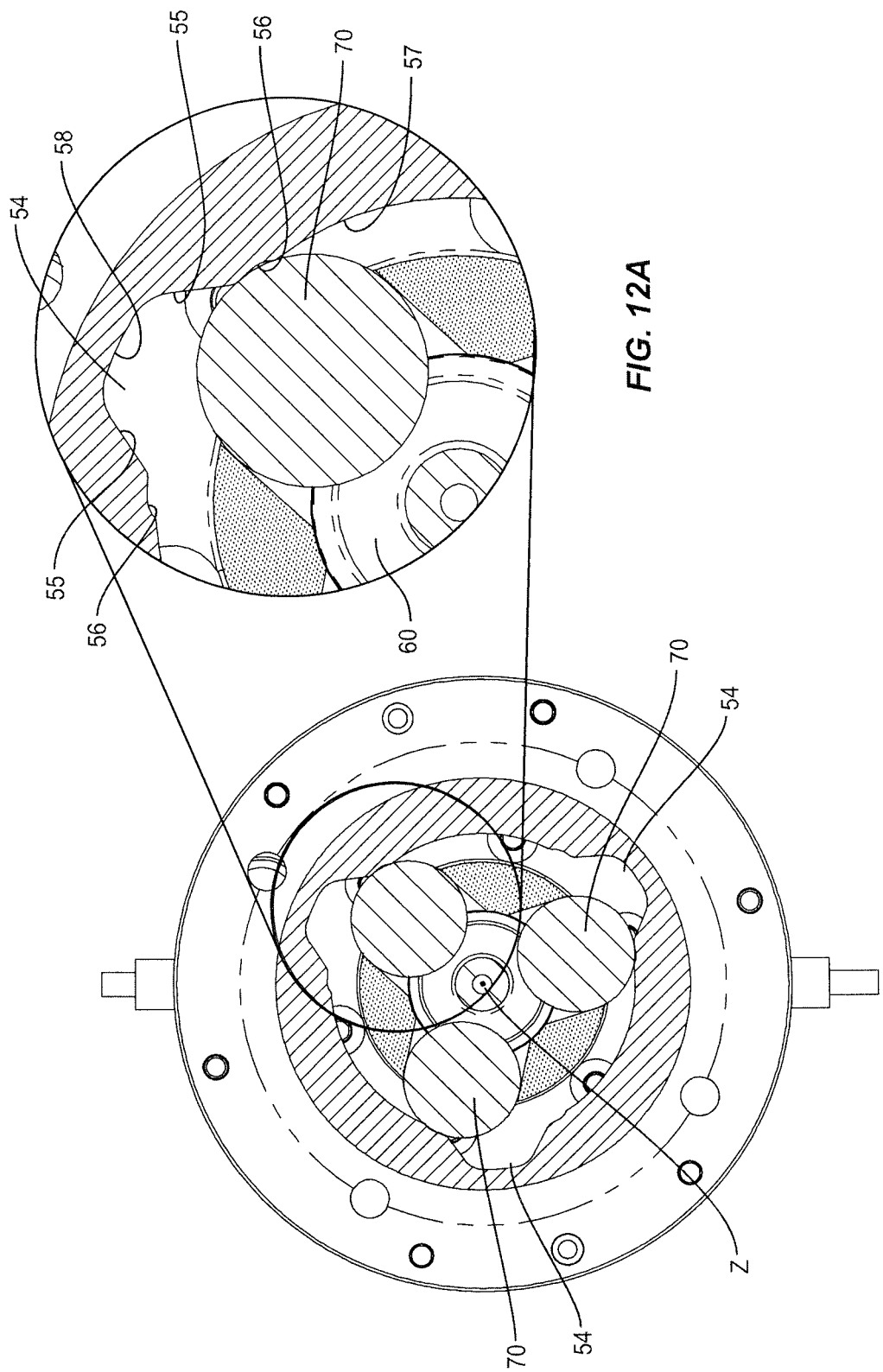
FIG. 12 is a sectional view of the device of FIG. 10 cut along line XII-XII.
FIG. 12A is a cut-away view of a section of FIG. 12 of a ball member positions relative to a lobe of a plate member.

As illustrated in FIG. 12A, each of the ball members 70 moves to the same rotational position within their respective lobe 54. This moves the ball members 70 away from contact with a trailing section of the lobe 54. Further, each of the ball members 70 is contained within their respective opening 32 in the ball cage 30. This prevents the ball members 70 from rotating with the second section 12. During the movement of the plate member 50, the ball members 70 may spin within the openings 32.

Figure 11:
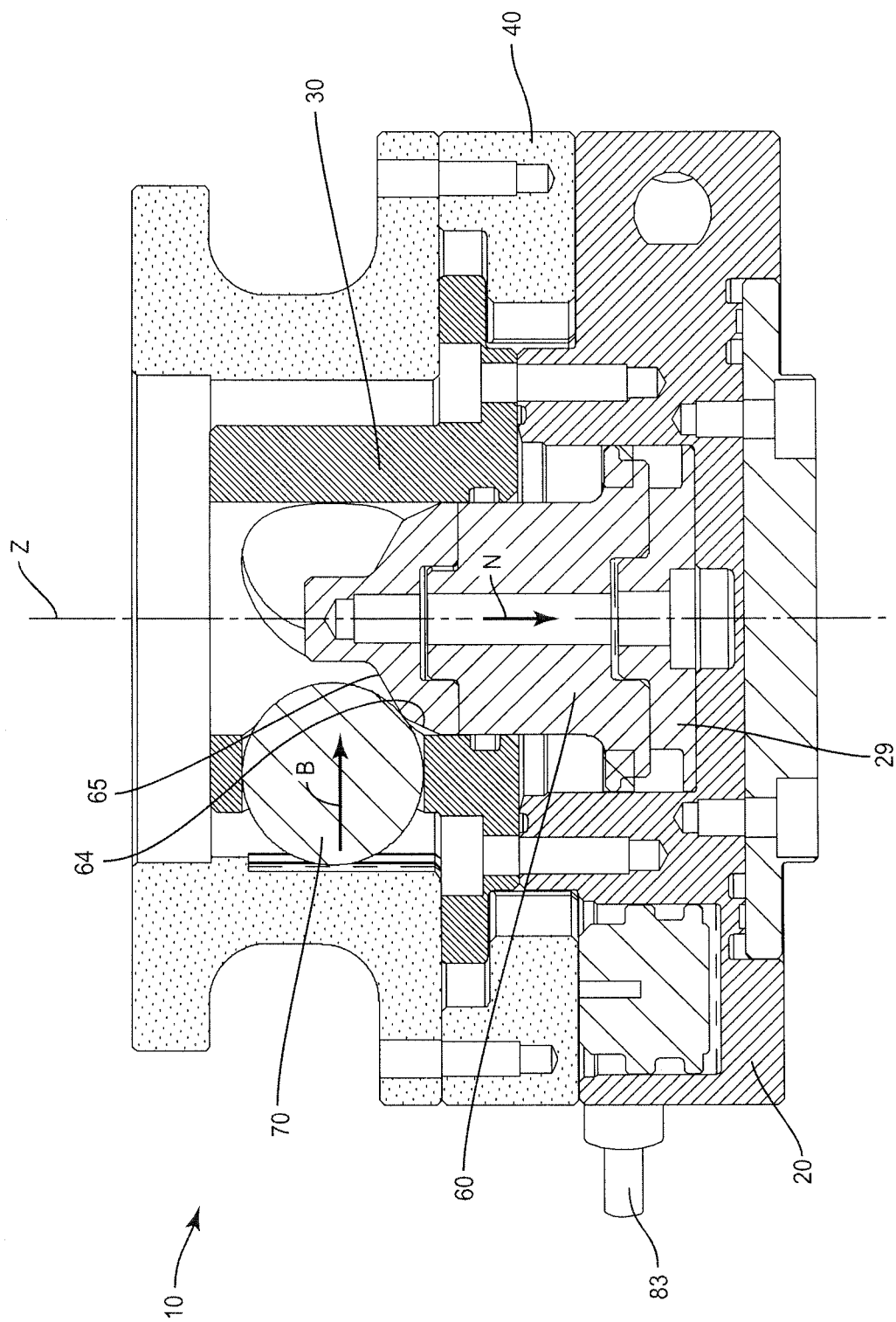
FIG. 11 is a sectional view of the device of FIG. 10 cut along line XI-XI.

The relative rotation of the plate member 50 also applies an inwardly radial force to the ball members 70 as illustrated by arrow B in FIG. 11. The angular orientation of the first section 64 further causes the ball members 70 to provide a downward axial force illustrated by arrow N to the piston 60. The downward force is caused by the ball members 70 contacting against the first section 64. As illustrated in FIG. 11, the ball member 70 remains in contact with the first section 64. The second section 65 is positioned at a large enough angle to allow for clearance for the relatively large diameter of the ball member 70.

In addition to complying rotationally about the z-axis, the device 10 also provides for the second section 12 to be movable in a plane relative to the first section 11. In one embodiment, this movement allows for movement of the second section 12 in the x-y plane. As best illustrated in FIG. 4, the inner diameter of the open central section 15 of the second section 12 is greater than an outer diameter of the first section 11. This size difference results in a gap 81 between the sections 11, 12. This gap 81 provides for the relative movement of the sections 11, 12.

The lateral movement occurs when the amount of force applied to the second section 12 overcomes the force being applied by the piston 60 and ball members 70. The force causes the one or more ball members 70 in the direction of the force to drive the piston downward. This movement of the piston 60 is caused by the one or more ball members 70 sliding along the first section 64 of the piston 60. The angle of the section 64 causes the downward force on the piston 60.

The one or more ball members 70 in a side away from the direction of the force may be loosely positioned in the device 10. This loose positioning is caused by the area in which they are contained becoming larger due to the movement of the second section 12. These one or more ball members 70 may move to various locations within the enlarged space. The ball members 70 remain contained within their areas due to their size and the amount of movement of the second section 12. When the force is removed (and if fluid or spring pressure is applied to the piston 60), the second section 12 will return to the home position and these one or more ball members 70 will again realign.

The device 10 is further configured to secure the relative positions of the first and second sections 11, 12. As illustrated in FIGS. 3 and 4, the base 20 may include one or more chambers 24 that are positioned within the peripheral section 23. The chambers 24 are open on the upper end. Each of the chambers 24 is sized to receive a piston 80. One or more feed lines 82 are further associated with the base 20 to move a fluid, such as air or a hydraulic fluid, to and from each chamber 24.

The pistons 80 are actuated by introducing the fluid 24 between a bottom of the chamber 24 and a bottom of the piston 80. This drives the piston 80 upward in the chamber 24 and into contact with the bottom of the ring 40 that extends over the top of the chamber 24. This force maintains the relative lateral position of the second section 12 relative to the first section 11.

The number of pistons 80 may vary. In one embodiment, pistons 80 are distributed around the base 20 to contact against the ring 40 at a number of different locations. Other embodiments may feature a single piston 80. The device 10 may be configured such that in multiple-piston embodiments, each of the pistons 80 is driven during engagement. The device 10 may be further configured such that a selected one or more of the pistons 80 are driven during engagement with other one or more of the pistons 80 remaining in an unengaged configuration in which fluid is not provided to their respective chamber 24.

The device 10 may include one or more sensors 83 that detect the relative position of the first and second sections 11, 12. The sensors 83 may be configured to determine the operation of the one or more pistons 80 to secure the positioning. In one embodiment, the device 10 includes two sensors 83. A first sensor 83 detects when the device 10 is in an unlocked or floating state, and a second sensor 83 detects when the device 10 is in the home or centered position.

In one embodiment as described above, a fluid, such as air or a hydraulic fluid is used to drive the piston 60. In another embodiment, one or more springs may be used to bias the piston 60 towards engagement with the ball members 70.

The first and second sections 11, 12 may be further connected to prevent the movement of the second section 12 away from the first section 11. This results from the ledge 42 of the ring member 40 being positioned under the flange 33 of the ball cage 30.

The various elements may be made from a variety of materials, including various metals. In one embodiment, the elements that come into contact with the ball members 70 are constructed from hardened steel. This construction provides for high repeatability of positioning the device in the centered, home position and provides for the device 10 to withstand a high number of cycles.

The device 10 is constructed and configured to provide for the two sections 11, 12 to remain connected together and also provides for the relative lateral and rotational movement. In one assembly method as best illustrated in FIG. 4, the process initially starts with piston 60 being placed into the cavity 21 in the base 20. Further, pistons 80 are placed into the chambers 24 in the base 20. The ring 40 is then placed against the upper surface of the base 20. The central opening 41 of the ring 40 is aligned with the cavity 21 in the base 20. Next, the ball cage 30 is connected to base 20 using one or more fasteners. This securely connects the ball cage 30 and base 20 and prevents their relative movement. Further, this positioning places the flange 33 of the ball cage 30 over the top side of the ring 40 thus prevent escape of the ring 40. Further, the ring 40 extends over the chambers 24 to prevent escape of the pistons 80. Afterwards, the plate member 50 is attached to the ring 40 using one or more fasteners. Thus, the plate member 50 and the ring 40 are non-movably connected together, and the base 20 and the ball cage 30 are non-movably connected together. However, the two sections 11, 12 are laterally movable relative to one another to provide for compliance along the plane.

Spatially relative terms such as "under", "below", "lower", "over", "upper", and the like, are used for ease of description to explain the positioning of one element relative to a second element. These terms are intended to encompass different orientations of the device in addition to different orientations than those depicted in the figures. Further, terms such as "first", "second", and the like, are also used to describe various elements, regions, sections, etc and are also not intended to be limiting. Like terms refer to like elements throughout the description.

As used herein, the terms "having", "containing", "including", "comprising" and the like are open ended terms that indicate the presence of stated elements or features, but do not preclude additional elements or features. The articles "a", "an" and "the" are intended to include the plural as well as the singular, unless the context clearly indicates otherwise.

The present invention may be carried out in other specific ways than those herein set forth without departing from the scope and essential characteristics of the invention. The present embodiments are, therefore, to be considered in all respects as illustrative and not restrictive, and all changes coming within the meaning and equivalency range of the appended claims are intended to be embraced therein.

What is claimed is:

1. A compensation device configured to be interposed between a robot and a robotic tool, the compensation device comprising:
    a first section having an interior space with an axis;
    a second section connected to the first section and including a central opening that is axially aligned with the interior space in a home position;
    a piston positioned within the first and second sections and being movable along the axis relative to each of the first and second sections;
    ball members positioned within the interior space and the central opening, the ball members being radially movable relative to the axis;
    the piston being movable along the axis between a first position and a second position, the first position being in proximity to a bottom of the interior space and the second position being farther away from the bottom of the interior space than the first position, the piston being in contact with the ball members in the second position to force the ball members radially outward away from the axis and into contact with the second section to secure the position about the axis of the second section relative to the first section;
    the first and second sections being mechanically interlocked through a radial flange on the first section that is positioned within a corresponding gap in the second section to connect the first and second sections together and prevent removal of the second section from the first section when the piston is in both the first and second positions;
    the second section being radially movable relative to the axis of the interior space of the first section, the second section being movable away from the home position to offset positions with the central opening being axially misaligned with the interior space; and
    a plurality of secondary pistons mounted in the first section and movable to contact against the second section to lock the position of the second section relative to the first section at the offset positions.

2. The device of claim 1, further comprising holes in the first section with one of the ball members positioned within each of the holes, the ball members being sized to be movable within the holes when radially moving relative to the axis.

3. The device of claim 2, wherein the holes are aligned around the periphery of the first section.

4. The device of claim 1, wherein the piston includes an angled contact surface that contacts against the ball members to force the ball members radially outward away from the axis, the contact surface being aligned at an acute angle relative to the axis.

5. The device of claim 1, wherein the piston, the interior space, the first section, and the central opening each include a circular sectional shape perpendicular to the axis.

6. The device of claim 1, wherein the second section is movably connected to the first section for movement in a plane that is perpendicular to the axis, the second section being further constrained to prevent movement along the axis away from the first section.

7. The device of claim 1, wherein the ball members spaced apart at equal intervals around the piston.

8. The device of claim 1, wherein the central opening is coaxial with the axis of the interior space when the device is in the home position with each of the ball members centered within different lobes in the second section.

9. A compensation device configured to be interposed between a robot and a robotic tool, the compensation device comprising:
    a first section;
    a piston positioned within the first section and movable along an axis, the piston including a contact surface;
    a second section including an open central section defined by a wall and having a plurality of lobes spaced around the wall and extending into the wall away from the central section, the second section being positioned relative to the first section with the wall extending radially around the first section and the piston, a flange on the first section being positioned axially under the second section to mechanically interlock and prevent removal of the second section from the first section;
    ball members having a spherical shape and being positioned within the second section and being spaced around the axis, the ball members being radially movable relative to the axis;
    the piston being movable along the axis between a first position and a second position, the first position including the contact surface spaced farther away from a second end of the second section than in the second position, the second position including the contact surface positioned against the ball members and positioning the ball members radially outward away from the axis and into the lobes with the ball members contacting against the lobes at two points to secure the position of the second section relative to the first section about the axis;

the second section movably connected to the first section for movement in a plane perpendicular to the axis;

each of the lobes includes a symmetrical shape about a centerline measured in the plane perpendicular to the axis, each of the lobes including a back wall, a first pair of outwardly extending sections adjacent to the back wall, and a second pair of outwardly extending sections adjacent to the first pair, the first pair of sections angled away from the centerline at a smaller angle than the second pair of sections.

10. The device of claim 9, wherein the lobes extend axially along the wall from a first end of the second section that faces towards the first section, each of the lobes being axially spaced away from the second end of the second section.

11. The device of claim 9, wherein each of the lobes has the same shape and the same dimensions.

12. The device of claim 9, further comprising a port that extends through the first section and into a chamber that holds the piston.

13. The device of claim 9, further comprising a plurality of secondary pistons mounted in the first section and movable to contact against the second section to lock the position of the second section within the plane relative to the first section with the second section being locked at positions with a center of the open central section being radially misaligned with the axis.

14. A compensation device configured to be interposed between a robot and a robotic tool, the compensation device comprising:

a first section having an interior chamber and a plurality of openings spaced around a periphery of the interior chamber;

a port that extends through the first section and into the chamber;

a piston positioned within the chamber and being sized to be movable along an axis of the chamber, the piston including a contact surface that radially faces outward away from the axis;

a second section including an interior space defined by a wall and having a plurality of lobes spaced around the wall and extending into the wall away from the interior space, the second section being connected to the first section with the lobes being radially aligned with the plurality of openings;

spherical ball members with one of the ball members positioned within each of the openings, the ball members being radially movable relative to the axis;

the piston being movable within the interior chamber and along the axis between a first position with the contact surface spaced away from at least one of the ball members and a second position with the contact surface in contact with the ball members and the piston sized to move the ball members radially outward away from the axis and into contact with the lobes to secure the rotational position of the second section relative to the first section about the axis;

the first and second sections are mechanically interlocked together when the piston is in both the first and second positions by a flange on the first section positioned within a gap formed between first and second members of the second section to prevent removal of the second section from the first section;

the second section being movable relative to the first section in a plane that is transverse to the axis.

15. The device of claim 14, wherein the second section is constrained to prevent movement of the second section along the axis and away from the first section.

16. The device of claim 14, wherein the ball members remain in the openings when the piston is in the second position.

17. The device of claim 14, wherein each of the lobes includes a symmetrical shape about a centerline measured in the plane perpendicular to the axis, each of the lobes including a back wall, a first pair of outwardly extending sections adjacent to the back wall, and a second pair of outwardly extending sections adjacent to the first pair, the first pair of sections angled away from the centerline at a smaller angle than the second pair of sections.

* * * * *